US 12,247,813 B2

(12) United States Patent
Thornhill et al.

(10) Patent No.: US 12,247,813 B2
(45) Date of Patent: Mar. 11, 2025

(54) PAYLOAD DELIVERY DEVICE

(71) Applicant: THOR INDUSTRIES LTD, Teffont (GB)

(72) Inventors: Lee Thornhill, Salisbury (GB); Alistair Wragg, Salisbury (GB); Fergus Duncan, Salisbury (GB)

(73) Assignee: THOR INDUSTRIES LTD, Teffont (GB)

( * ) Notice: Subject to any disclaimer, the term of this patent is extended or adjusted under 35 U.S.C. 154(b) by 71 days.

(21) Appl. No.: 18/307,266

(22) Filed: Apr. 26, 2023

(65) Prior Publication Data

US 2024/0010335 A1  Jan. 11, 2024

(30) Foreign Application Priority Data

Jul. 5, 2022 (GB) ....................................... 2209844

(51) Int. Cl.
*F42B 25/00* (2006.01)
*B64D 1/04* (2006.01)
*F42B 10/04* (2006.01)
*F42B 12/00* (2006.01)
*F42C 5/00* (2006.01)
*F42C 9/00* (2006.01)

(52) U.S. Cl.
CPC .............. *F42B 25/00* (2013.01); *F42B 10/04* (2013.01); *F42B 12/00* (2013.01); *F42C 5/00* (2013.01); *B64D 1/04* (2013.01); *F42C 9/00* (2013.01)

(58) Field of Classification Search
CPC .......... F42B 10/04; F42B 10/06; F42B 12/00; F42B 12/20; F42B 25/00; F42B 33/02; F42C 1/00; F42C 5/02; F42C 9/00; B64D 1/04; B64D 7/08

USPC ......................................................... 102/396
See application file for complete search history.

(56) References Cited

U.S. PATENT DOCUMENTS

| 4,344,489 | A | 8/1982 | Bonaparte |
| 8,746,355 | B2 * | 6/2014 | Demmitt ................. F42B 12/50 239/69 |
| 11,185,724 | B1 | 11/2021 | Beard |
| 11,685,527 | B2 * | 6/2023 | Treadway ............... F42B 12/10 89/1.51 |
| 11,754,380 | B2 * | 9/2023 | Benson ................... F41A 21/36 89/37.16 |
| 11,840,339 | B2 * | 12/2023 | Sly ............................ F42D 3/00 |
| 2012/0138319 | A1 | 6/2012 | Demmitt |
| 2012/0291613 | A1 | 11/2012 | Rastegar |
| 2016/0216091 | A1 | 7/2016 | Erickson et al. |
| 2021/0116221 | A1 | 4/2021 | Benson |

FOREIGN PATENT DOCUMENTS

| EP | 4303529 A1 * | 1/2024 | ............... B64D 1/04 |
| GB | 2620396 A * | 1/2024 | ............... B64D 1/04 |
| WO | 2018063076 A1 | 4/2018 | |

* cited by examiner

*Primary Examiner* — James S Bergin
(74) *Attorney, Agent, or Firm* — Lorenz & Kopf, LLP

(57) ABSTRACT

Disclosed herein is a payload delivery device. The payload delivery device is configured for delivering an explosive component. The payload delivery device comprises a first module having an interior cavity for containing an explosive component. The payload delivery device further comprises at least one attachment module connected to the central module via a connection means. The at least one attachment module having an interior cavity for containing an additional component.

15 Claims, 3 Drawing Sheets

PAYLOAD DELIVERY DEVICE

CROSS REFERENCE TO RELATED APPLICATION

This application claims priority to United Kingdom Patent Application No. 2209844.6, filed Jul. 5, 2022, the entire content of which is incorporated by reference herein.

TECHNICAL FIELD

Embodiments of the subject matter described herein relate generally to droppable payload delivery devices. More particularly, embodiments of the subject matter described herein relate to droppable explosive payload delivery devices for mounting on unmanned aerial systems (UAS) and subsequent release from the UAS.

BACKGROUND

Munition users can deliver explosive payloads via conventional delivery systems, such as artillery or hand-held launchers. One advantage of a conventional delivery system is that explosive payloads with different effects may be delivered to a target, for example anti-armor or anti-personnel payloads.

It would be desirable for explosive payloads with differing effects to be delivered via unmanned aerial systems (UAS) such as unmanned aerial vehicles (UAVs), for example drones. This would allow a user to distance themselves from the location where the explosive payload is delivered.

Furthermore, it would be desirable to allow for such explosive payloads to be customized by a user so as to produce different effects upon detonation. In particular, it would be desirable to allow for the shape of the explosion to be altered and/or the type of explosion to be tailored to a specific type of target.

It would further be desirable for a user of the explosive payload device to be able to self-fill the device so as to avoid the complicated and time-consuming issues associated with the storage and transportation of assembled explosive devices.

Lastly, it would be desirable for the explosive payload device to be deployed without destruction of or damage to the UAS upon which the explosive payload device is initially mounted.

Furthermore, other desirable features and characteristics will become apparent from the subsequent detailed description and the appended claims, taken in conjunction with the accompanying drawings and the foregoing technical field and background.

BRIEF SUMMARY

According to a first aspect of the invention, there is provided a payload delivery device for delivering an explosive component. The payload delivery device comprises a first module defining an interior cavity for containing, at least in part, an explosive component. The interior cavity is accessible to a user to allow for the user to configure the explosive component within the interior cavity. The payload delivery device also includes an attachment device configured to releasably attach the payload delivery device to an unmanned aerial system (UAS). The payload delivery device also includes a sensor configured to sense an environmental parameter; a memory configured to store a stored environmental parameter; and a controller configured to compare the sensed environmental parameter to the stored environmental parameter. The controller is configured, on the basis of the comparison, to transmit a trigger signal configured to cause a detonator included in the payload delivery device to detonate the explosive component.

In an embodiment, the sensor is an altimeter and the stored environmental parameter is a pressure value.

In an embodiment, the memory is read-writable (RWM) to allow a user to select or edit the stored environmental parameter.

In an embodiment, the payload delivery device further comprises a receiver configured to receive transmissions from an associated transmitter, wherein the memory is operably connected to the receiver such that the stored environmental parameter may be remotely edited by a user via an electromagnetic wave transmission.

In an embodiment, the payload delivery device includes a second sensor, wherein the controller is configured to transmit the trigger signal also on the basis of a comparison of a second sensed environmental parameter to a second stored environmental parameter stored in the memory. The second sensor may be a timer and the second stored environmental parameter may be a value of time after release of the payload delivery device.

In an embodiment, the memory is read-writable (RWM) to allow a user to edit the second stored parameter.

In an embodiment, the payload delivery device further comprises a receiver configured to receive transmissions from an associated transmitter, wherein the memory is operably connected to the receiver such that the second stored parameter may be remotely edited by a user via an electromagnetic wave transmission.

In an embodiment, the payload delivery device further includes a battery configured to supply electrical energy to the controller and to the memory.

In an embodiment, the controller and memory are shielded from electronic transmissions.

In an embodiment, the payload delivery device includes a second module that is releasably connectable in a direct or indirect manner to the first module, wherein the second module comprises stabilizer fins.

When the payload delivery device includes stabilizer fins, the payload delivery device may also include guidance means, wherein the stabilizer fins are movable based upon control signals from the guidance means so as to allow steering of the payload delivery device after release from the UAS.

In an embodiment, the attachment device comprises a receiver and is configured to detach the payload delivery device from the UAS to which it is mounted upon receipt of an electromagnetic wave transmission from a transmitter.

In an embodiment, the explosive component comprises one or more of anti-personnel/fragmentation components; anti-armour components; a shaped charge liner; and an element for forming an explosively formed projectile (EFP).

In an embodiment, the first module comprises a detonator holder sized and configured to receive a detonator. This allows for easy placement of a detonator into the payload delivery device.

According to a second aspect of the invention, there is provided a kit of parts operable to be assembled into a payload delivery device as described above.

According to a third aspect of the invention, there is provided a method comprising 3D printing at least one of the first module or the attachment device of the payload delivery device as described above or the kit of parts as described above.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Figure 1:
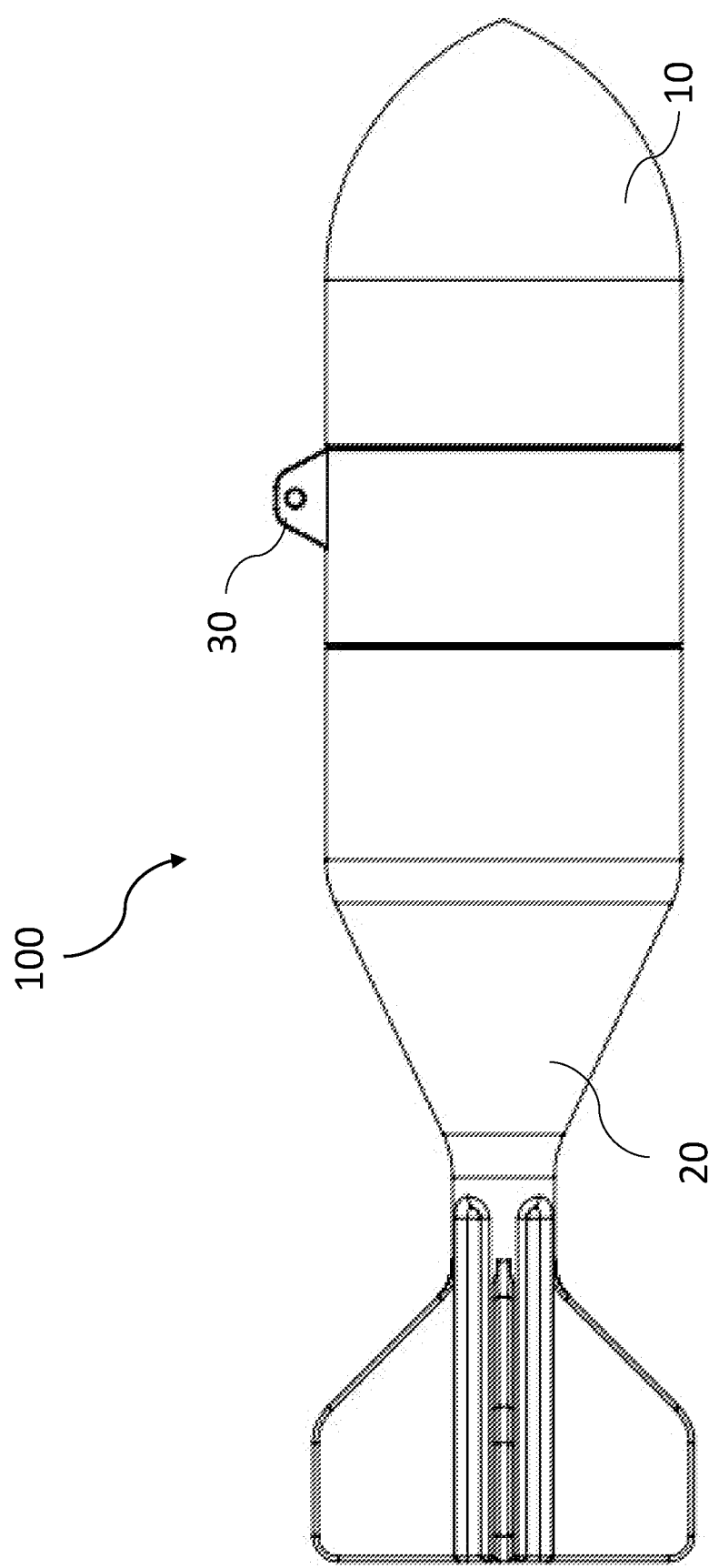
FIG. 1 shows a payload delivery device in accordance with an embodiment of the invention.

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

In addition, certain terminology may also be used in the following description for the purpose of reference only, and thus are not intended to be limiting. For example, terms such as "top", "base", "upper", "lower", "above", and "below" refer to directions in the drawings to which reference is made. Terms such as "front", "back", "rear", "side", "outboard", and "inboard" describe the orientation and/or location of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second", and other such numerical terms referring to structures do not imply a sequence or order unless clearly indicated by the context.

For the sake of brevity, conventional techniques related to the operation of payload delivery devices and other functional aspects of the systems (and the individual operating components of the systems), such as how detonators operate, may not be described in detail herein. Furthermore, any connecting lines shown in the various figures contained herein are intended to represent exemplary functional relationships and/or physical couplings between the various elements. It should be noted that many alternative or additional functional relationships or physical connections may be present in an embodiment of the subject matter.

It should be appreciated that the below-described payload delivery device, and any corresponding elements, individually or in combination, are exemplary means for performing a claimed function.

When seeking to address the above-described problems associated with conventional payload delivery devices, after an extensive period of research and development the present inventors realized that a payload delivery device may be constructed so as to allow a user to easily configure the explosive component of a payload delivery device. As used herein, the term "configure the explosive component" means the user either self-filling the payload delivery device with explosives or modifying a pre-existing explosive component in some manner, for example to produce a different effect. Additionally, it was realized that allowing for user self-filling of the payload delivery device allows for circumvention of the need to transport assembled explosive devices over a logistics chain and instead assembly the payload delivery device may be assembled shortly prior to use.

Additionally, the present inventors discovered that dropping conventional explosive devices from UAS such as drones is not feasible due to certain conditions that must be achieved in order for a conventional explosive device to detonate. For example, in order for a typical 40 mm grenade to detonate, the 40 mm grenade must first experience a certain acceleration and rotate a certain number of times about its axis to align internal components within the 40 mm grenade. Dropping a 40 mm grenade from a UAS such as a drone is therefore unlikely to result in detonation of the 40 mm grenade. The present invention seeks to address this issue by providing a user-configurable payload delivery device that is suitable for being delivered by dropping from a UAS such as a drone.

FIG. 1 of the application shows a payload delivery device 100 in accordance with an embodiment of the present invention. The payload delivery device 100 includes a first module 10, a second module 20 and an attachment device 30. Preferably, the first module 10 is releasably connectable to the second module 20. The releasable connection between the first and second modules 10, 20 may be a screw thread connection, a connection utilizing resilient members having corresponding projections and grooves, or another type of releasable connection as would be contemplated by one of skill in the art. The first module 10 comprises an interior cavity (not shown in this figure) within which an explosive component may be placed, for example a readily available plastic explosive such as C4. The interior cavity may wholly or only partly contain this explosive component. In an embodiment, the connection of the first module 10 to the second module 20 encapsulates the interior cavity within the first module 10 and releasing the connection between the first and second modules 10, 20 exposes the interior cavity to allow for user-filling of the interior cavity.

The payload delivery device 100 also comprises an attachment device 30, which is configured to releasably attach the payload delivery device 100 to an unmanned aerial system (UAS), for example a drone. In an embodiment, the attachment device 30 may comprise a hook or another geometric shape configured to mate with a corresponding projection on the UAS. In this embodiment, release of the payload delivery device 100 from the UAS is controlled by the UAS. Alternatively, the attachment device 30 may comprise a movable component, for example a movable clamp arm. In this embodiment, the release of the payload delivery device 100 is controlled solely by the attachment device 30, with no input required from the UAS. The release of the payload delivery device 100 from the UAS may be triggered in various ways, for example an automatic release based on a determination from a sensing means mounted on the payload delivery device, such as a camera equipped with image recognition software or a GPS system. In this embodiment, the payload delivery device 100 is automatically released from the UAS in the event that some precondition is satisfied (such as an image of an enemy combatant armored vehicle being recognized or the UAS traversing to a specific location).

Alternatively, the release of the payload delivery device 100 may be triggered via receipt of a transmission from a user of the payload delivery device 100 at a receiver operably connected to the attachment device 30. Advantageously, the transmission frequency of the transmission to cause release of the payload delivery device 100 from the UAS is different to a frequency of the transmission used to control the UAS itself, such that any electronic countermeasures used against the UAS (such as targeted signal jamming of certain frequencies of radio wave transmission) may not be effective against the function of the attachment device 30 so as to still allow the payload delivery device to be released from the UAS and deployed even if the UAS is itself subject to these electronic countermeasures.

Figure 2:
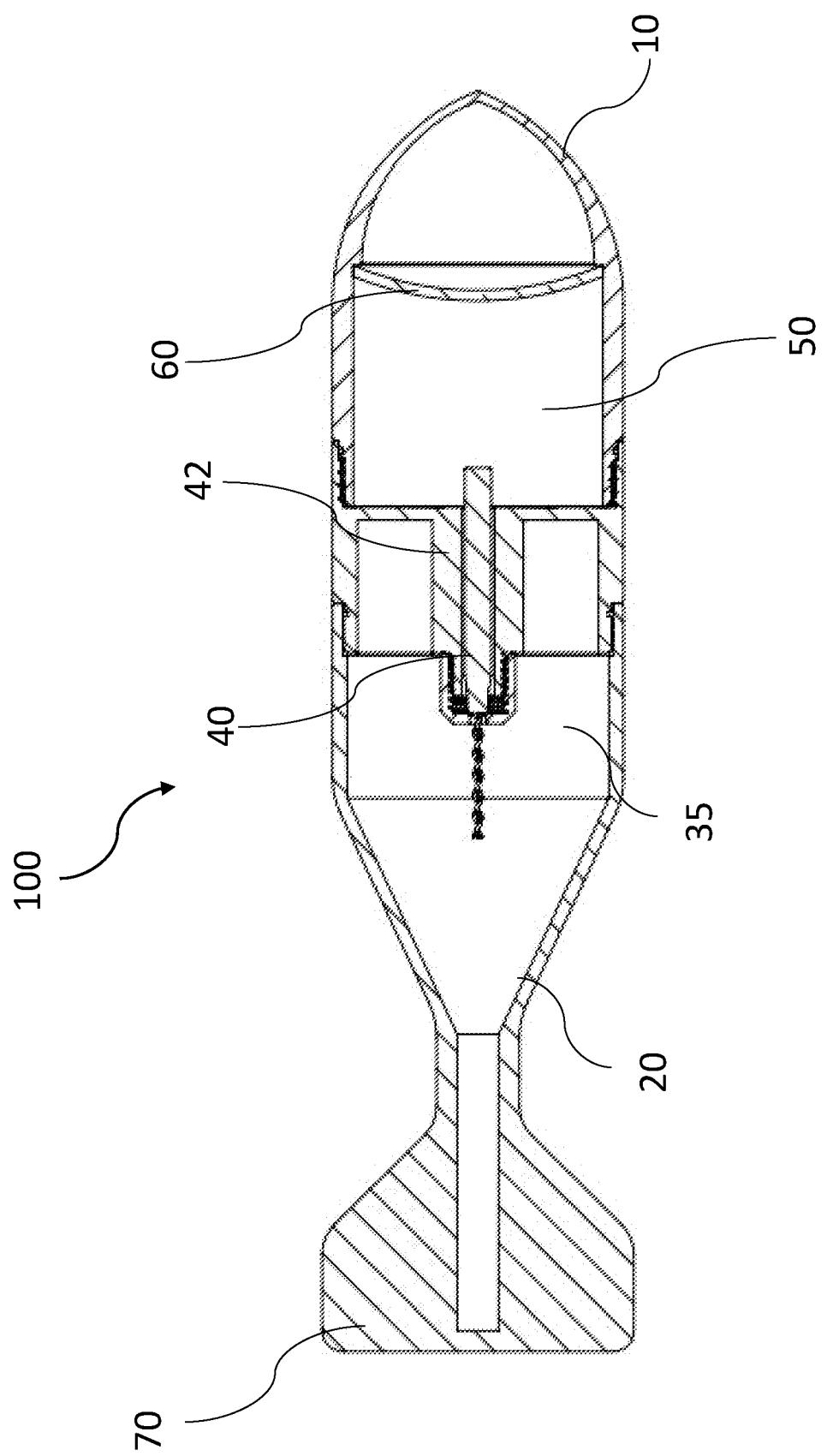
FIG. 2 shows a cross-section of a payload delivery device in accordance with an embodiment of the invention.

A cross-section of the payload delivery device 100 of FIG. 1 is shown in FIG. 2. As can be seen in FIG. 2, the first module 100 comprises an interior cavity 50, within which an explosive component may be located. In the embodiment shown in FIG. 2, the payload delivery device 100 includes a detonator holder 42 configured to hold a detonator 40. As would be known to one of skill in the art, a detonator is configured to, upon receiving a trigger signal, detonate an explosive component such as C4. When a detonator 40 and the explosive component are both included in the payload delivery device, transmitting a trigger signal to the detonator 40 allows for detonation of the explosive component.

The payload delivery device 100 also includes an electronics compartment 35, within which various electronics are included. In an embodiment, at least a sensor, a controller and a memory are included in the electronics of the payload delivery device 100. The sensor is configured to sense an environmental parameter and supply the sensed environmental parameter to the controller. The controller is configured to compare the sensed environmental parameter to a stored environmental parameter and, on the basis of the comparison, transmit a trigger signal to the detonator. For example, if the sensor includes an altimeter configured to detect pressure, the sensed pressure values obtained from the sensor may be compared to a stored pressure value contained within the memory. If the sensed pressure value is within a threshold of the stored pressure value, the controller is configured to generate and transmit a trigger signal to the explosive component. In an alternative embodiment, the sensor may comprise an accelerometer configured to sense acceleration values of the payload delivery device 100. If the sensed acceleration value is within a threshold of the stored acceleration value, the controller is configured to generate and transmit a trigger signal to the explosive component. In another embodiment, the sensor may comprise a timer configured to sense time values after release of the payload delivery device 100 from the UAS. If the sensed time value is within a threshold of a stored time value, the controller is configured to generate and transmit a trigger explosive component.

Preferably, the electronics comprise more than one sensor such that multiple parameters are sensed and compared to multiple respective stored environmental parameters. For example, both pressure and acceleration values may be sensed and compared to respective stored pressure and acceleration values. If both of the sensed pressure and acceleration values are within a threshold of the stored pressure and acceleration values, the controller is configured to transmit a trigger signal to the detonator. By basing the generation of the trigger signal on more than one sensed environmental parameter, the likelihood of an accidental detonation of the explosive component is decreased. For example, a stored time value may ensure that the payload delivery device is sufficiently far away from the UAS before detonation to prevent damage of the UAS, and a stored pressure value may ensure that the explosive component detonates at a desired altitude so as to produce, for example, an air burst/blast effect. As another example, generation of the trigger signal may be based on also on whether an impact switch included in the payload delivery device has been activated, to indicate whether or not the payload delivery device has hit a surface. As will be appreciated from the above disclosure, the generation of the trigger signal may be based on as many or as few of the outputs of the various sensors as desired in order to adapt the conditions where the trigger signal is generated to a specific circumstance.

In an embodiment, the memory is read-writable (RW) such that the user may select and/or change the values of the stored environmental parameter(s). Adaptation or selection of the values of the stored environmental parameters allows for further customization of the conditions with which the trigger signal is generated. For example, the user may select only the altimeter to be used as the basis for generation of the trigger signal if an airburst effect is desired at a specific altitude (i.e., the user has filled the interior cavity with an explosive component configured to deliver an airburst effect). Alternatively, the user may select all of the altimeter, an impact switch and a timer to be used as the basis for generation of the trigger signal if the user wishes to delay detonation of the explosive component for a period of time after impact has occurred. Still further alternatively, the user may select the altimeter and the impact switch to be used as the basis for generation of the trigger signal if simple detonation-upon-impact is desired after the payload delivery device has been dropped to a certain altitude. Further combinations of different sensors are also possible, depending upon the desired functionality.

User selection or adaptation of the stored environmental parameters may be performed by a wired connection, for example by connecting the memory to a computer or mobile device, or by a wireless connection, for example by an electromagnetic wave transmission that is received by a receiver operably connected to the memory. In this manner, the user is able to adapt the altitude at which the explosive component detonates or other associated parameters. When the connection to the RW memory is wireless, the user is able to adapt these parameters during flight of the UAS to the target zone, in order to compensate for local terrain such as hills that may alter the target's altitude. When the connection to the RW memory is not wireless, the controller, the sensor and the memory may be shielded from electronic transmissions by way of a faraday cage or other such shielding equipment to protect against electronic countermeasures.

Figure 3:
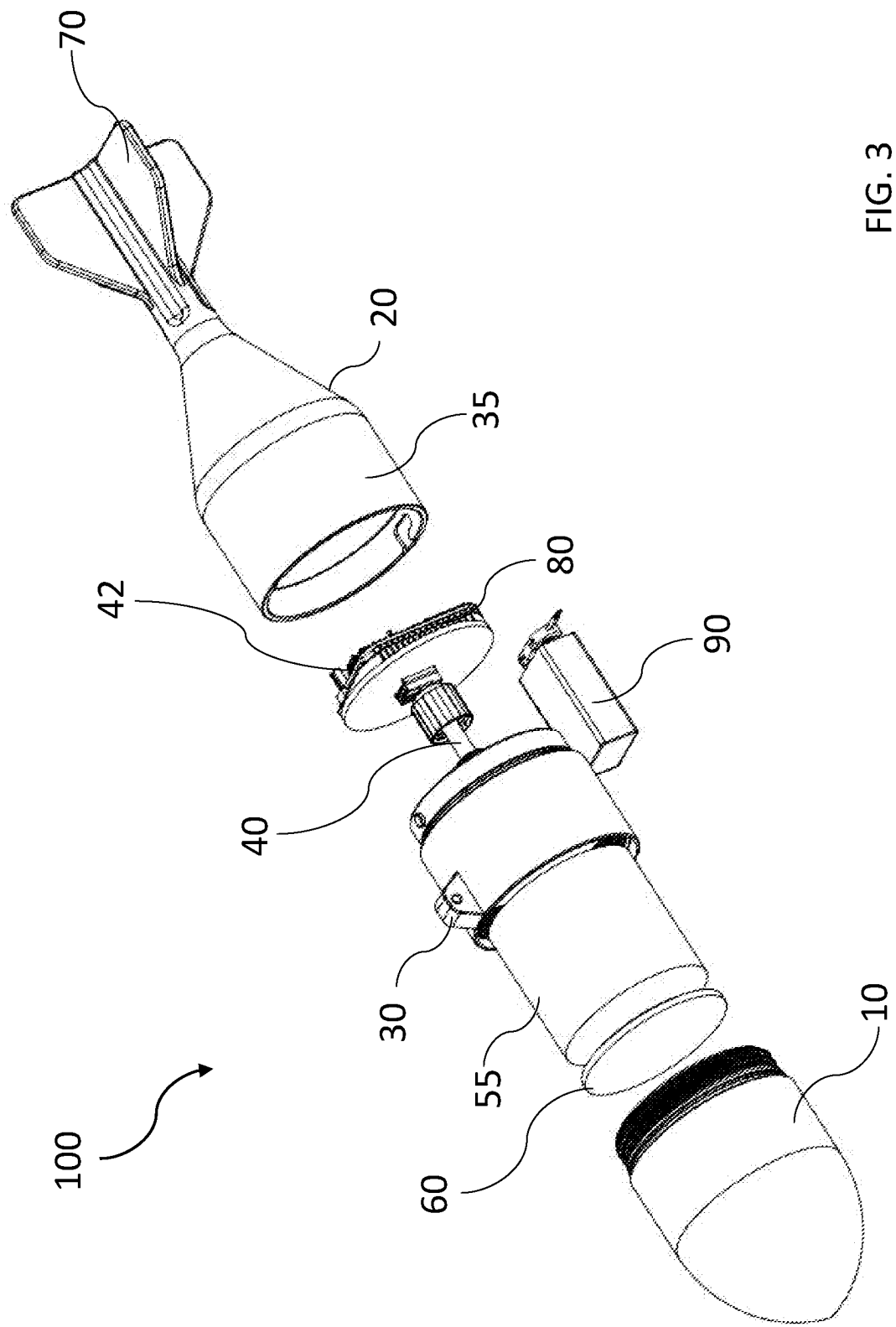
FIG. 3 shows an exploded view of a payload delivery device in accordance with an embodiment of the invention.

In order to supply electrical power to the controller, the memory and the sensors, the payload delivery device may include a battery 90 as shown in FIG. 3.

As can also be seen in FIG. 2, the second module 20 preferably comprises stabilizer fins 70 to assist in the aerodynamic performance of the payload delivery device. In operation, the stabilizer fins ensure that the first module 10 is positioned below the second module 20 during dropping of the payload delivery device from the UAS.

In an embodiment, the second module 20 includes actuators configured to alter the angle of the stabilizer fins based on signals from a guidance means, such as a laser guidance system or GPS. In this manner, the payload delivery device may be guided toward a target that is not located vertically below the UAS, and may allow for an increased range of delivery of the payload delivery system 100 as well as a more accurate delivery of payload delivery device 100 to a target.

An exploded view of a fully assembled payload delivery device 100 is shown in FIG. 3. As can be seen in this figure, the payload delivery device 100 includes electronics 80 which includes a controller, at least one sensor and a memory. The electronics 80 are housed within the electronics compartment 35 of the second module 20. It will be appreciated that the electronics may alternatively be housed within another area of the payload delivery device 100, for example within the first module 10. The payload delivery device 100 includes a battery 90 configured to supply electrical power to the electronics 80. The assembled payload delivery device further comprises a detonator 40 operably connected to the controller of the electronics 80 and configured to receive a trigger signal therefrom. The detonator is operably connected to an explosive component 55 contained, at least in part, within an interior cavity of the first module 10. The payload delivery device 100 further comprises a charge liner 60, thereby allowing for the payload delivery device 100 to act as a shaped charge. It will be appreciated that the inclusion or omission of components such as the charge liner 60 is dependent upon the configuration of the payload delivery device as chosen by a user.

As explained above, the payload delivery device 100 is configured to be mounted to a UAS, for example a drone. It is noted that the specifications, such as maximum carry weight of UAS differ from system to system, and the total size of the payload delivery device 100 may accordingly be altered to as to take into account the specifications of the specific UAS upon which the payload delivery device 100 is to be used with. For example, the payload delivery device 100 may be made larger or smaller depending on the maximum carry weight of the UAS.

Preferably, the payload delivery device 100 may be transported as a kit of parts without the detonator and the explosive component, to thereby comply with regulations governing the transport of explosives. Assembly of the payload delivery device 100 from the kit of parts requires the user to at least insert the explosive component into the interior cavity of the first module and then insert a detonator into the explosive component.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

The invention claimed is:

1. A payload delivery device for delivering an explosive component, the payload delivery device comprising:
    a first module, the first module defining an interior cavity for containing, at least in part, the explosive component, wherein the interior cavity is accessible to a user to allow for the user to configure the explosive component within the interior cavity;
    an attachment device configured to releasably attach the payload delivery device to an unmanned aerial system (UAS);
    a first sensor configured to sense an environmental parameter;
    a second sensor configured to sense a second parameter, different to the environmental parameter;
    a memory configured to store a stored environmental parameter and to store a stored second parameter; and
    a controller configured to compare the sensed environmental parameter to the stored environmental parameter and to compare the sensed second parameter to the stored second parameter and, on the basis of the comparisons, to transmit a trigger signal configured to cause a detonator to detonate the explosive component.

2. The payload delivery device of claim 1, wherein the first sensor is an altimeter and the stored environmental parameter is a pressure value.

3. The payload delivery device of claim 1, wherein the memory is read-writable (RWM) to allow the user to edit the stored environmental parameter.

4. The payload delivery device of claim 3, further comprising a receiver configured to receive transmissions from an associated transmitter, wherein the memory is operably connected to the receiver such that the stored environmental parameter may be remotely edited by the user via an electromagnetic wave transmission.

5. The payload delivery device of claim 1, wherein the second sensor is a timer and wherein the second stored parameter is a value of time after release of the payload delivery device from a UAS.

6. The payload delivery device of claim 1, wherein the second sensor is an impact switch and wherein the second stored parameter is activation of the impact switch.

7. The payload delivery device of claim 5, wherein the memory is read-writable (RWM) to allow the user to edit the second stored parameter.

8. The payload delivery device of claim 7, further comprising a receiver configured to receive transmissions from an associated transmitter, wherein the memory is operably connected to the receiver such that the second stored parameter may be remotely edited by the user via an electromagnetic wave transmission.

9. The payload delivery device of claim 1, further comprising a battery configured to supply electrical energy to the controller and to the memory.

10. The payload delivery device of claim 1, wherein the controller and the memory are shielded from electronic transmissions.

11. The payload delivery device of claim 1, further comprising a second module that is releasably connectable in a direct or indirect manner to the first module, wherein the second module comprises stabilizer fins.

12. The payload delivery device of claim 11, further comprising guidance means and wherein the stabilizer fins are movable based upon control signals from the guidance means so as to allow steering of the payload delivery device after release of the payload delivery device from the UAS.

13. The payload delivery device of claim 1, wherein the attachment device comprises a second receiver and is configured to detach the payload delivery device from the UAS to which it is mounted upon receipt, by the second receiver, of an electromagnetic wave transmission.

14. A kit of parts comprising parts operable to be assembled into a payload delivery device comprising:

a first module, the first module defining an interior cavity for containing, at least in part, an explosive component, wherein the interior cavity is accessible to a user to allow for the user to configure the explosive component within the interior cavity;

an attachment device configured to releasably attach the payload delivery device to an unmanned aerial system (UAS);

a first sensor configured to sense an environmental parameter;

a second sensor configured to sense a second parameter, different to the environmental parameter;

a memory configured to store a stored environmental parameter and to store a stored second parameter; and a controller configured to compare the sensed environmental parameter to the stored environmental parameter and to compare the sensed second parameter to the stored second parameter and, on the basis of the comparisons, to transmit a trigger signal configured to cause a detonator to detonate the explosive component.

15. A method for manufacturing a payload delivery device, the method comprising:

producing parts of the payload delivery device including:
a first module, the first module defining an interior cavity for containing, at least in part, an explosive component, wherein the interior cavity is accessible to a user to allow for the user to configure the explosive component within the interior cavity;

an attachment device configured to releasably attach the payload delivery device to an unmanned aerial system (UAS);

a first sensor configured to sense an environmental parameter;

a second sensor configured to sense a second parameter, different to the environmental parameter;

a memory configured to store a stored environmental parameter and to store a stored second parameter; and a controller configured to compare the sensed environmental parameter to the stored environmental parameter and to compare the sensed second parameter to the stored second parameter and, on the basis of the comparisons, to transmit a trigger signal configured to cause a detonator to detonate the explosive component, wherein three-dimensional (3D) printing is used to form at least one of the first module or the attachment device.

* * * * *